United States Patent
Bock et al.

(10) Patent No.: US 7,054,058 B2
(45) Date of Patent: May 30, 2006

(54) PUMPING SOURCE HAVING A NUMBER OF PUMP LASERS FOR RAMAN AMPLIFICATION OF A WDM SIGNAL WITH THE AID OF MINIMIZED FOUR-WAVE MIXING

(75) Inventors: Harald Bock, Augsburg (DE); Richard Neuhauser, Neufahrn (DE)

(73) Assignee: Siemens Aktiengesellschaft, Munich (DE)

( * ) Notice: Subject to any disclaimer, the term of this patent is extended or adjusted under 35 U.S.C. 154(b) by 322 days.

(21) Appl. No.: 10/095,382

(22) Filed: Mar. 11, 2002

(65) Prior Publication Data

US 2002/0145793 A1 Oct. 10, 2002

(30) Foreign Application Priority Data

Mar. 9, 2001 (DE) .......................... 101 11 491

(51) Int. Cl.
*H01S 3/00* (2006.01)

(52) U.S. Cl. ..................................... 359/334
(58) Field of Classification Search ............... 359/334
See application file for complete search history.

(56) References Cited

U.S. PATENT DOCUMENTS

| | | | | | |
|---|---|---|---|---|---|
| 6,330,104 | B1 * | 12/2001 | Kim et al. | .................... | 359/332 |
| 6,384,963 | B1 * | 5/2002 | Ackerman et al. | .......... | 359/334 |
| 6,424,455 | B1 * | 7/2002 | Dmitri | ......................... | 359/334 |
| 6,445,492 | B1 * | 9/2002 | Nielsen et al. | ............... | 359/334 |
| 6,459,525 | B1 * | 10/2002 | Aso et al. | .................... | 359/332 |
| 6,483,633 | B1 * | 11/2002 | Onishi et al. | .......... | 359/341.31 |
| 6,545,780 | B1 * | 4/2003 | Takachio et al. | .................... | 1/1 |
| 6,597,495 | B1 * | 7/2003 | Gertsvolf et al. | ........ | 359/341.3 |
| 2001/0036347 | A1 * | 11/2001 | Hansen et al. | .............. | 385/123 |
| 2002/0114065 | A1 * | 8/2002 | Neuhauser | ................ | 359/341.3 |
| 2002/0131119 | A1 * | 9/2002 | Hamoir et al. | ............... | 359/134 |
| 2002/0145777 | A1 * | 10/2002 | Bock et al. | .................. | 359/124 |
| 2003/0081307 | A1 * | 5/2003 | Fludger et al. | ............. | 359/334 |

FOREIGN PATENT DOCUMENTS

EP 1241748 A2 * 9/2002

OTHER PUBLICATIONS

Agrawal, Govind. Fiber–Optic Communications Systems. 2nd Edition. 1997. pp. 327–328.*
Shtaif et al. The interplay between nonlinear effects in modern optical communications sytems. Lasers and Electro–Optics Society, 2001. Nov. 12, 2001–Nov. 13, 2001.*
Agrawal, "Fiber Optic Communication Systems", Second Edition, pp. 380–381.
Agrawal, "Nonlinear Fiber Optics", Second Edition, 1995, pp. 404–407.
IEEE Photonics Technology Letters, May 1999, vol. 11, No. 5, pp. 530–532.
Shu Namiki et al., "Broadband Raman amplifiers design and practice", Proc. OAA 2000, Quebec, OMB 2, 7–9.
P10048460.3, Raman Verstarker pp. 1–12, No English translation. Sep. 29, 2000.

* cited by examiner

*Primary Examiner*—Jack Keith
*Assistant Examiner*—Deandra Hughes
(74) *Attorney, Agent, or Firm*—Bell, Boyd & Lloyd LLC

(57) ABSTRACT

A pumping source for Raman amplification of an optical wavelength-division multiplex signal which has a number of pump lasers with different pumping wavelengths in each case. The pumping wavelengths are selected in such a way that mixing products from a four-wave mixing are minimized in or removed from the signal spectrum. Transmission bands for the channels of the WDM signal also can be defined in the signal spectrum such that the mixing products are situated between the transmission bands. Differences in the signal-to-noise ratios between the channels of the WDM signal on the basis of four-wave mixing are, therefore, efficiently minimized in the signal spectrum.

3 Claims, 5 Drawing Sheets

PUMPING SOURCE HAVING A NUMBER OF PUMP LASERS FOR RAMAN AMPLIFICATION OF A WDM SIGNAL WITH THE AID OF MINIMIZED FOUR-WAVE MIXING

BACKGROUND OF THE INVENTION

The use of rising numbers of channels in the transmission of an optical wavelength-division multiplex (WDM) signal along lengthy fiber links leads, in conjunction with the same total output power of the optical amplifiers, to a reduction in the output power in the fiber per transmission channel and, thus, to a worsening of the optical signal-to-noise ratios OSNR at the receiver, which are decisive for the achievable bit error rate BER. A similar problem arises with increasing the data rate. In order to achieve an identical system performance after raising the data rate, a higher OSNR must be achieved at the receiver than with a lower data rate. Achieving a sufficient OSNR at the receiver is, therefore, a critical point in the design of future system generations.

Optical amplifier modules are required downstream of respective transmission sections for the purpose of transmitting an optical WDM signal along lengthy fiber links. An effective method for additionally amplifying a signal is based on stimulated Raman scattering, in the case of which a pumping signal is fed into the transmission fiber. The pumping signal can be generated in this case via a number of pumping sources; namely, laser diodes.

The prior art known in this context is explained in more detail below with the aid of FIGS. 1 to 3.

As shown in FIG. 1, the use of a number of pumping wavelengths leads to a broad flat gain spectrum in the C-band and L-band.

The wavelength set of the pumping sources is set such that all the channels of the WDM signal are amplified as identically as possible, taking account of the Raman gain spectrum (see "Fiber Optic Communication Systems", G. P. Agrawal, 2nd edition, page 381, FIG. 8.11). A channel with a frequency shift of 13.2 THz relative to a pumping frequency is amplified to the maximum. If there is a smaller or larger frequency difference between a channel and a pumping signal, the channel is amplified less. By using a relatively large number of different pumping wavelengths, all the channels of the WDM transmission signals are amplified more homogeneously.

Such a Raman amplifier is described, for example, in a prior German patent application with the file reference P 10048460.3.

Mach-Zehnder interferometers, which permit operation for launched powers of up to 2 W, for example, are often used for multiplexing the various pumping wavelengths. This requires a pumping wavelength array with pumping wavelengths that are equidistant from one another. A detailed description is given in the publication "Namiki et al., Proc. OAA 2000, Quebec, OMB 2, 7–9". It is also possible to use interference filters when multiplexing a small number of pumping wavelengths. In this case, non-equidistant spacings of the pumping wavelengths also can be achieved. The power launched in such multiplexers is, however, lower than in the case of Mach-Zehnder interferometers. In the publication "Kidorf et al., IEEE Phot. Technol. Lett., 11 (1999), 530–532", there is a description of non-equidistant distribution of the pumping wavelengths in the case of which a greater concentration of the smaller pumping wavelengths is provided by comparison with larger pumping wavelengths. A corresponding power transfer from small to larger pumping wavelengths is compensated as a result by Raman interaction along the fiber.

Four-wave mixing FWM occurs between the pumping wavelengths in specific fiber types, primarily in the case of low dispersion in the region of the pumping wavelengths, when use is made of equidistant pumping wavelengths, such as $(\lambda_1, \ldots, \lambda_8)$ in FIG. 2, for signal transmission in the C-band and L-band; that is, pumping wavelengths between approximately 1 420 nm and 1 510 nm, signal wavelengths between approximately 1 525 nm and 1 610 nm. Consequently, new frequency components, or what are termed mixing products $MP_i$ (i>0), are generated in the case of sums or differences of pumping frequencies that are superimposed in or outside the spectrum of the pumping source (see FIG. 2). The mixing products can, therefore, be superimposed directly on the WDM signal spectrum if the higher pumping wavelengths are near the smaller signal wavelengths. The signal quality, such as the signal-to-noise ratios OSNR of specific channels of the WDM signal, is thereby worsened. The levels of the WDM signal in the wavelength region are illustrated in FIG. 3. As illustrated in FIG. 3, four-wave mixing leads to signal-to-noise ratio OSNR differences of 8 dB owing to the superimposition of mixing products in the signal spectrum. The described effect occurs particularly strongly with a broadband Raman amplification in the C-band and L-band, since the pumping wavelengths must reach close to the C-band for an amplification in the L-band. The strongest mixing products are, therefore, situated in the C-band and are superimposed on the signal spectrum.

A detailed description of four-wave mixing is given in "Agrawal, Nonlinear Fiber Optics, 1995, page 404". In this context, there is a description here of the differences between a degenerated and a non-degenerated four-wave mixing FWM. The non-degenerated four-wave mixing is based on the interaction of photons of three different wavelengths that produce a photon at a fourth wavelength, while in the case of the degenerated four-wave mixing, a wavelength features in a quasi-doubled fashion in the mixing process. The non-degenerated four-wave mixing, therefore, requires three different wavelengths, while the degenerated four-wave mixing can be performed given two wavelengths. The strongest mixing product from four-wave mixing in the case of a broadband pumping source with a number of pumping wavelengths $(\lambda_1, \ldots, \lambda_m)$ is thus located at a spacing of $\lambda_m - \lambda_{m-1}$ after the highest pumping wavelength $\lambda_m$ in the case of degenerated four-wave mixing.

It is, therefore, an object of the present invention to eliminate, or at least strongly minimize, the influence of the mixing products in the signal spectrum that are caused by four-wave mixing FWM in a broadband pumping source.

SUMMARY OF THE INVENTION

In the case of the pumping source according to the present invention, the pump lasers will have pumping wavelengths whose mixing products owing to four-wave mixing FWM are situated partly outside and/or in gaps within the spectrum of the WDM signal. This strongly reduces the OSNR differences between the channels of the WDM signal.

When the signal spectrum is divided into different transmission bands, the pumping wavelengths of the pump lasers are selected in such a way that one or more mixing products are situated between the transmission bands of the spectrum of the WDM signal. It is advantageous not to transmit any channels of the WDM signal in the region of the mixing products.

By a suitable selection of the spacing between the largest pumping wavelengths of the pump lasers and the predefined smallest signal wavelengths, the first and strongest mixing product from degenerated four-wave mixing FWM over the pumping wavelength region will fall not inside, but outside the signal spectrum. The further mixing products will be superimposed on the signal spectrum, on the one hand, or fall outside the signal spectrum.

The pumping wavelengths are also selected to be narrow, and the pumping wavelength spacings to be as equal as possible in order to reduce the width of the mixing products from the four-wave mixing FWM.

Additional features and advantages of the present invention are described in, and will be apparent from, the following Detailed Description of the Invention and the Figures.

DETAILED DESCRIPTION OF THE INVENTION

Figure 1:
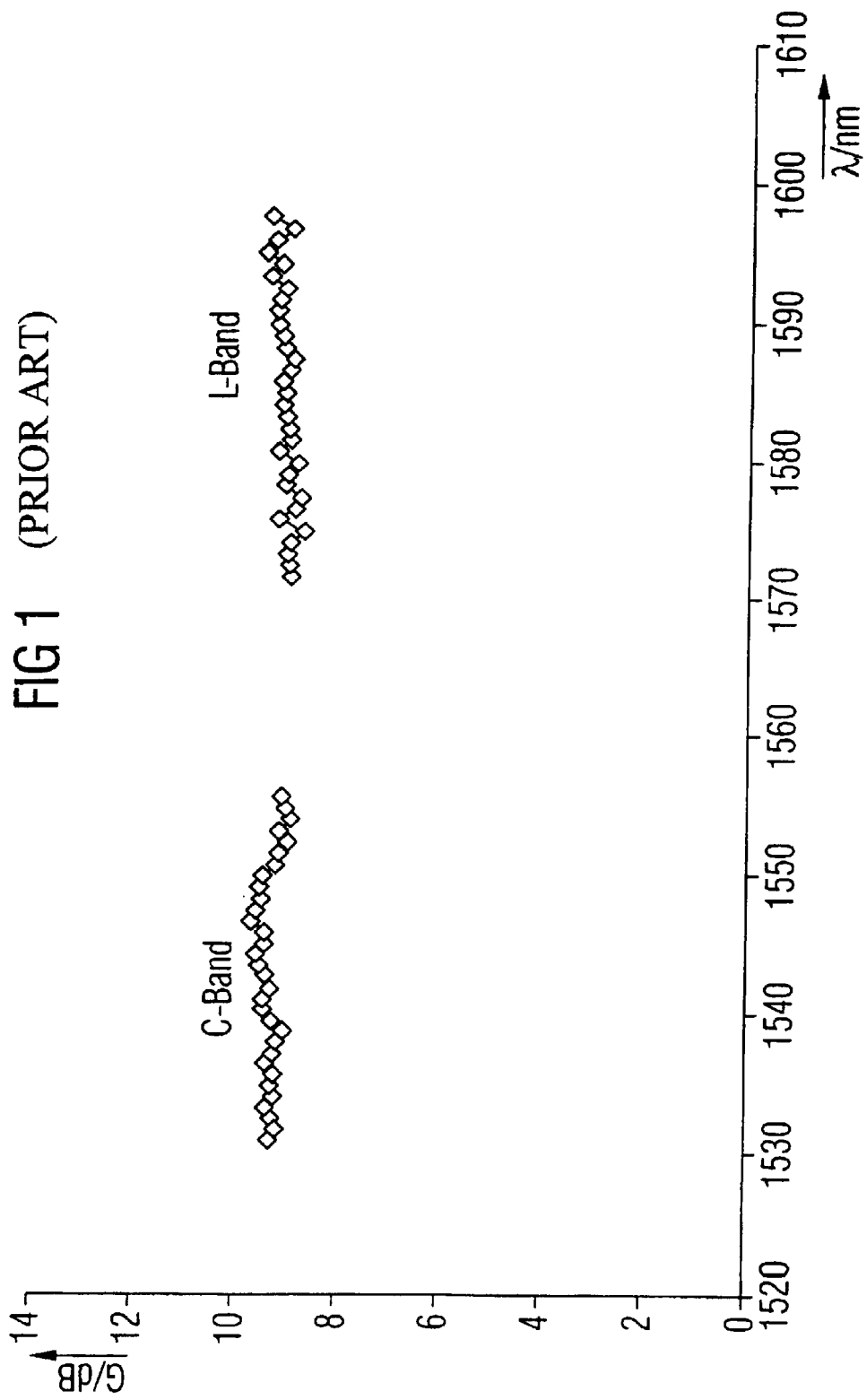
FIG. 1 shows the Raman gain in the C-band and L-band.
Figure 2:
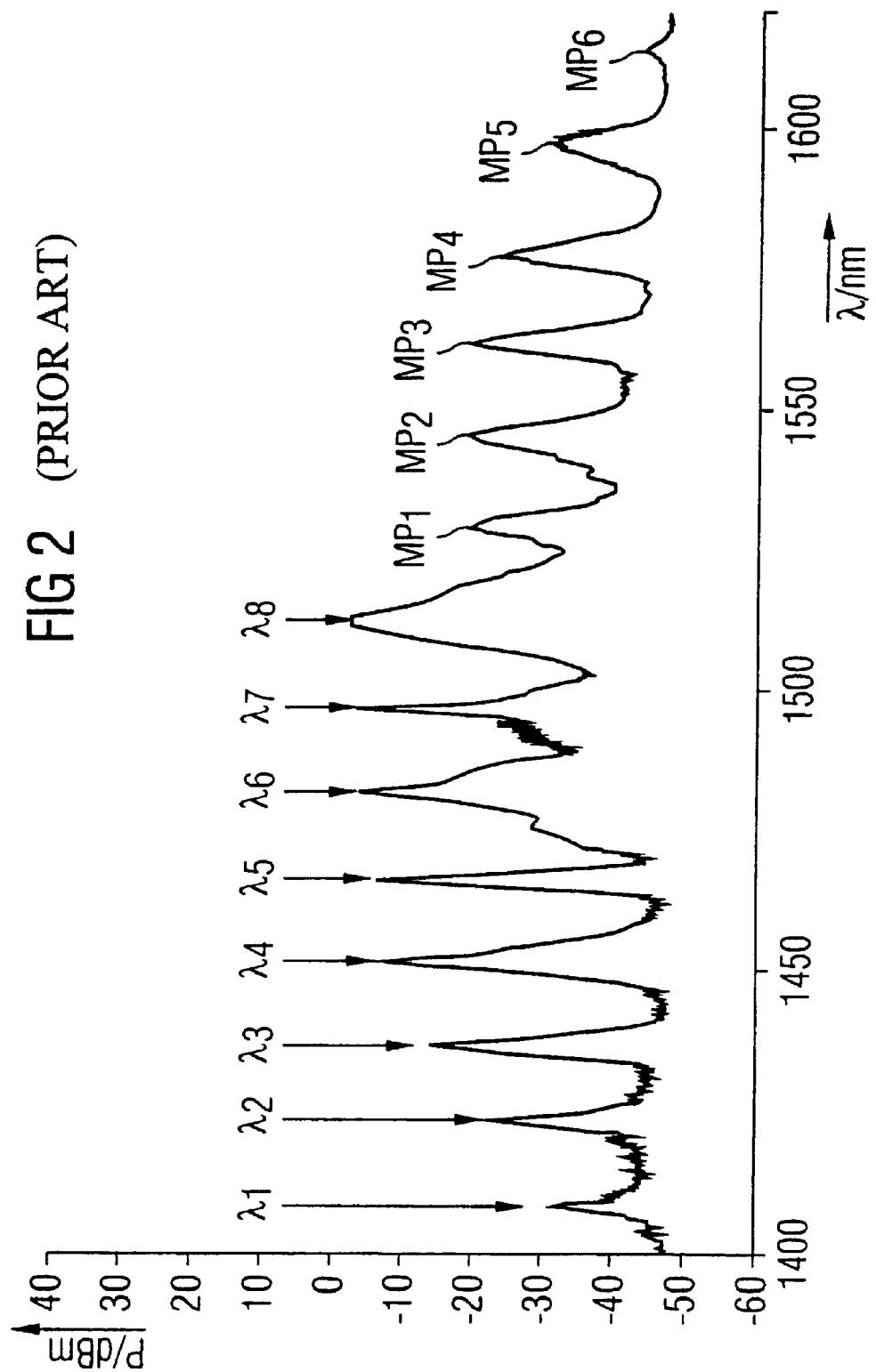
FIG. 2 shows the mixing products due to four-wave mixing FWM in the wavelength region of the pumping source and of the WDM signal.
Figure 3:
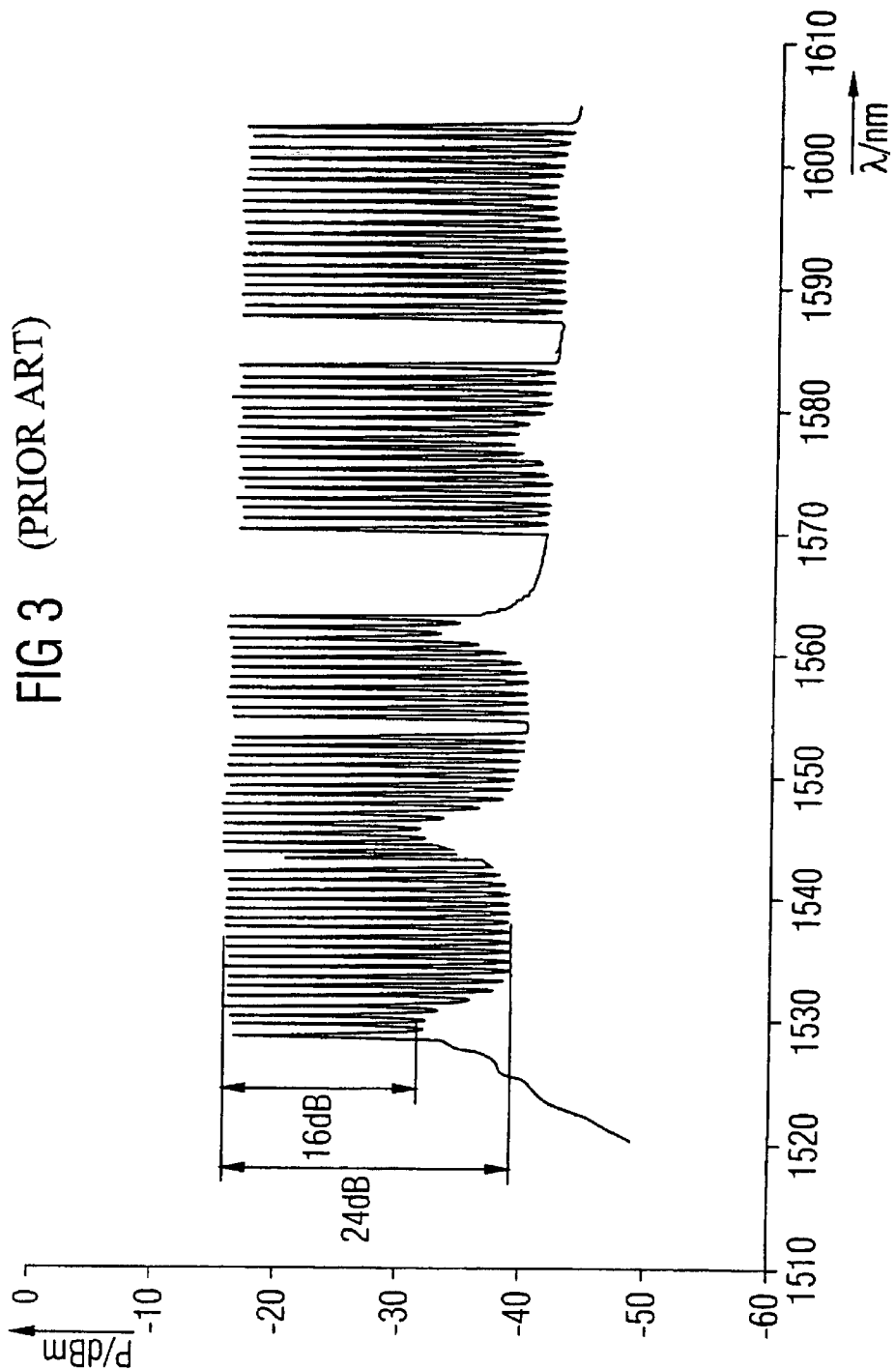
FIG. 3 shows the respect of the level of the channels of the WDM signal in the case of four-wave mixing FWM.
Figure 4:
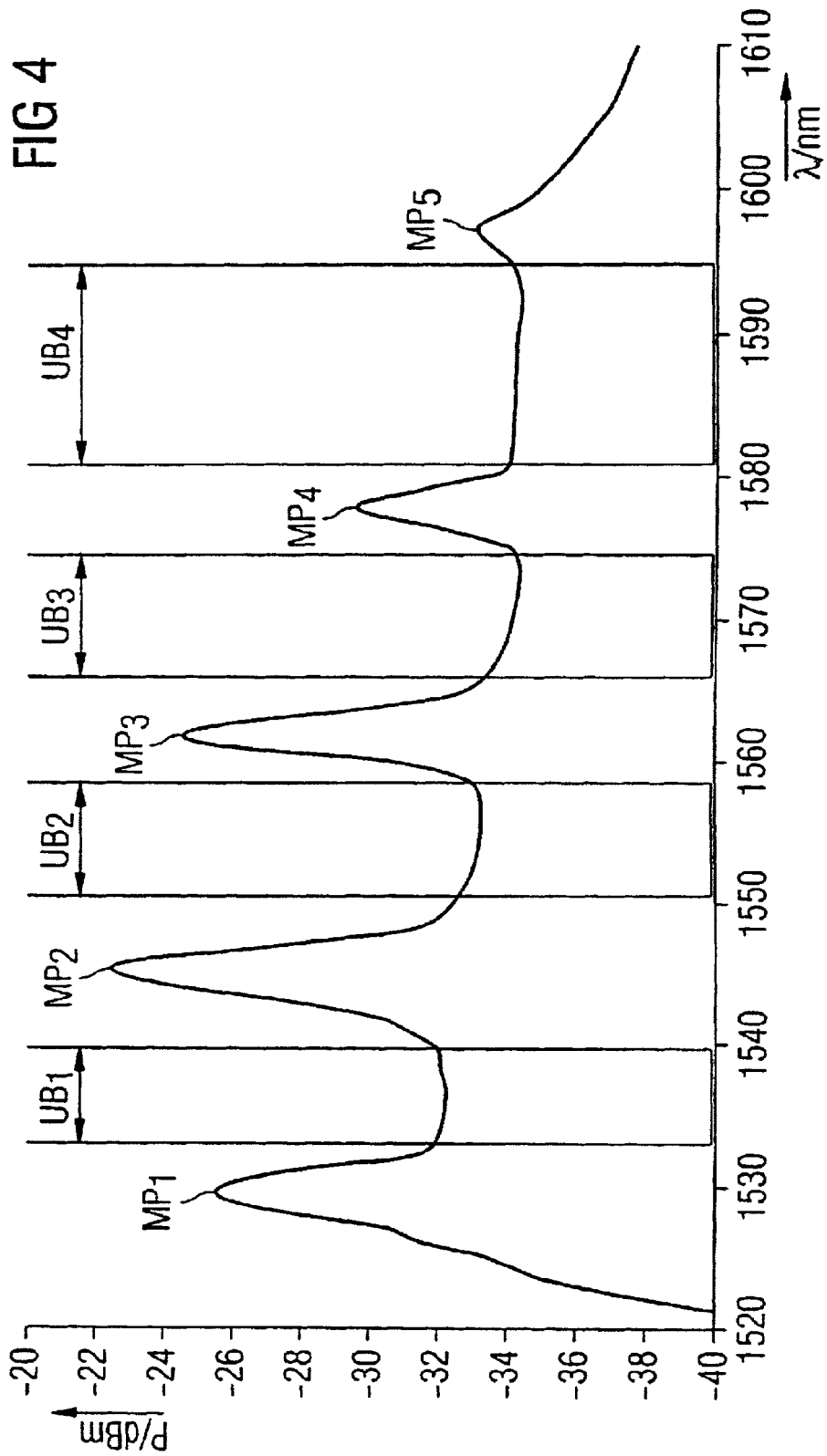
FIG. 4 shows the transmission bands of the WDM signal outside the mixing products in the case of four-wave mixing FWM.

In FIG. 4, the pump lasers $PL_1, \ldots, PL_m$ are connected without transmission of the WDM signal. In the case of this arrangement, five mixing products or FWM peaks MP1, ..., MP5 are measured at the end of the pumping wavelength multiplexer in the wavelength region of 1 520 nm<$\lambda$<1 610 nm of the signal spectrum as level P in dBm. Four transmission bands UB1, ..., UB4 in which the channels of the WDM signal can be transmitted without disturbance by four-wave mixing FWM can be delimited between the five mixing products. The first mixing product MP1 at 1 528 nm falls before the first transmission band UB1.

Figure 5:
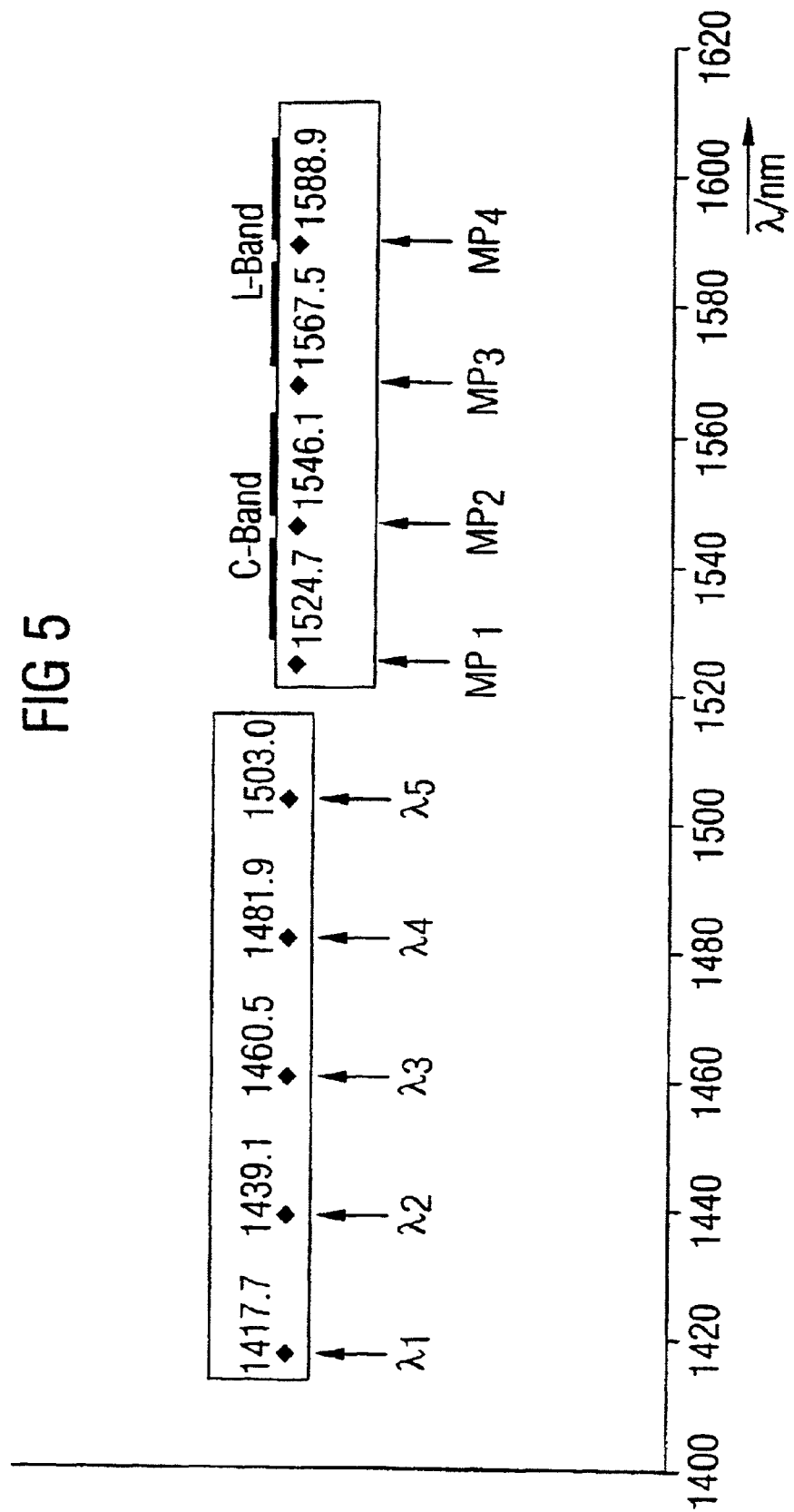
FIG. 5 shows an example of a pumping wavelength array according to the present invention in the case of transmission in the C-band and L-band.

A pumping wavelength array $\lambda_1, \ldots, \lambda_5$ having five pump lasers $PL_1, \ldots, PL_6$ is illustrated in FIG. 5. Four mixing products $MP_1, \ldots, MP_4$ occur partially in front of the signal spectrum and partially inside the signal spectrum in the C-band and L-band. Two transmission bands UB1, UB2 in the C-band and two further bands UB3, UB4 permit transmission of the WDM signal without disturbance by the four-wave mixing FWM.

A further exemplary embodiment would be the use of eight non-equidistant pumping wavelengths that are multiplexed in common via interference filters. The eight pumping wavelengths can be selected in the region from 1 420 nm to 1 510 nm for transmission in the C-band and L-band (between approximately 1 525 nm to 1 610 nm). In order to compensate a power transfer by Raman interactions, either the pumping wavelength spacings are kept small for the small wavelengths and larger for the large wavelengths, or the output power of the small wavelengths is selected to be greater than that of the large wavelengths; for example, by using two pump lasers instead of one in the case of a small pumping wavelength. The different spacings of the pumping wavelengths are also optimized in such a way that, on the one hand, mixing products that are as small as possible occur in the signal spectrum or, on the other hand, the superimposition of the individual gain spectra yields a sufficiently flat gain spectrum.

Although the present invention has been described with reference to specific embodiments, those of skill in the art will recognize that changes may be made thereto without departing from the spirit and scope of the present invention as set forth in the hereafter appended claims.

What is claimed is:

1. A pumping source, comprising a plurality of pump lasers for Raman amplification of a wavelength-division multiplex signal, wherein the pump lasers have pumping wavelengths whose mixing products are situated within gaps of the spectrum of the wavelength-division multiplex signal.

2. A pumping source as claimed in claim 1, wherein at least one of the mixing products is situated between transmission bands of the spectrum of the wavelength-division multiplex signal.

3. A pumping source as claimed in claim 1, wherein the pumping wavelengths are particularly selected such that further mixing products are situated at least partly outside of the spectrum of the wavelength-division multiplex signal.

* * * * *